United States Patent [19]

Debus, Jr. et al.

[11] Patent Number: 4,759,039
[45] Date of Patent: Jul. 19, 1988

[54] SIMPLIFIED RECOVERY OF DATA SIGNALS FROM QUADRATURE-RELATED CARRIER SIGNALS

[75] Inventors: Walter Debus, Jr., Nottingham, N.H.; Howard C. Reeve, III, Methuen; Curtis A. Siller, Jr., Andover, both of Mass.

[73] Assignees: American Telephone & Telegraph Company, New York, N.Y.; Bell Telephone Laboratories, Incorporated, Murray Hill, N.J.

[21] Appl. No.: 920,367

[22] Filed: Oct. 20, 1986

[51] Int. Cl.[4] .......................... H04L 5/12; H03H 7/30
[52] U.S. Cl. ........................................ 357/39; 375/15; 375/67; 375/103
[58] Field of Search .................... 375/39, 102, 103, 15, 375/43, 61, 60, 67, 52

[56] References Cited

U.S. PATENT DOCUMENTS

| | | | |
|---|---|---|---|
| 3,646,448 | 2/1972 | Harmon, Jr. et al. | 375/39 |
| 3,793,589 | 2/1974 | Puckette | 375/61 |
| 3,845,412 | 10/1974 | Rearwin et al. | 375/43 |
| 3,918,001 | 11/1975 | Sailer et al. | 375/61 |
| 3,978,407 | 8/1976 | Forney, Jr. et al. | 375/39 |
| 4,028,626 | 6/1977 | Motley et al. | 375/15 |
| 4,237,554 | 12/1980 | Gitlin et al. | 375/15 |
| 4,253,186 | 2/1981 | Godard | 375/39 |
| 4,528,526 | 7/1985 | McBiles | 375/67 |
| 4,567,602 | 1/1986 | Kato et al. | 375/60 |
| 4,644,565 | 2/1987 | Seo et al. | 375/39 |

Primary Examiner—Benedict V. Safourek
Assistant Examiner—Andrew J. Telesz, Jr.
Attorney, Agent, or Firm—David R. Padnes

[57] ABSTRACT

A technique is presented for simplifying the recovery of two synchronous data signals having a common symbol rate after each signal has respectively modulated a different one of a pair of quadrature-related carrier signals. In the transmitter, the data signal which modulates one of the quadrature-related carrier signals is delayed relative to the data signal which modulates the other quadrature-related carrier signal. This delay is related to an IF frequency chosen at the receiver. After passing through a noisy transmission channel, the quadrature-related carrier signals are coupled in the receiver to a serial combination of an equalizer and analog-to-digital converter. This combination outputs multiple, substantially distortion-free samples of the data signals each symbol interval. The two data signals are then recovered by selecting a subset of the samples provided each symbol interval.

6 Claims, 3 Drawing Sheets 4,759,039

SIMPLIFIED RECOVERY OF DATA SIGNALS FROM QUADRATURE-RELATED CARRIER SIGNALS

TECHNICAL FIELD

The present invention relates to digital communications systems and, more particularly to such systems wherein information is conveyed on quadrature-related carrier signals, i.e., carrier signals having a phase angle of 90 degrees therebetween.

BACKGROUND OF THE INVENTION

In the quest for communications systems with an ever greater information-carrying capacity per unit of time, i.e., baud rate, modulation formats are used in which data signals modulate a pair of quadrature-related carrier signals having the same frequency. The frequency of the carrier signals which is modulated is commonly referred to as the intermediate frequency (IF) which may be transmitted or, in the case of radio systems is generally upconverted or translated to a higher frequency. Such modulation of phase quadrature carrier signals is referred to by a variety of names, such as quadrature amplitude modulation (QAM), phase shift keying (PSK), or amplitude and phase modulation (APSK). The information represented by the data signals is, of course, virtually limitless and can represent voice, video, facsimile and the like. In addition, the transmission channel propagating the modulated carrier signals is also not limited and, at present, may include air, wire, or lightguide.

In systems utilizing the above-described modulation formats, the data signals are recovered in the system receiver which utilizes a complex array of circuitry comprising demodulators, Nyquist filters for spectral shaping, threshold detectors, carrier and timing recovery circuits and distortion compensation apparatus, such as equalizers and/or cancellers. In order to reduce the cost and physical size of the system receiver, a technique of recovering data signals from quadrature-related carrier signals requiring less circuitry would be highly desirable.

SUMMARY OF THE INVENTION

In accordance with the present invention, the amount of circuitry required for the recovery of synchronous data signals having a common symbol rate from quadrature-related carrier signals is substantially reduced. This reduction is achieved by first introducing a predetermined delay between the data signal which modulates one of the carrier signals and the data signal which modulate the other one of the carrier signals. These modulated carrier signals may be transmitted at some IF frequency or translated to some other frequency. After propagating through noisy transmission channel, the modulated carrier signals enter the receiver and are coupled to a serial combination of an equalizer and an analog-to-digital converter. This combination provides multiple distortion-free data signal samples per symbol interval. The data signals are then recovered by selecting a subset of the distortion-free data signal samples provided each symbol interval.

DETAILED DESCRIPTION

Figure 1:
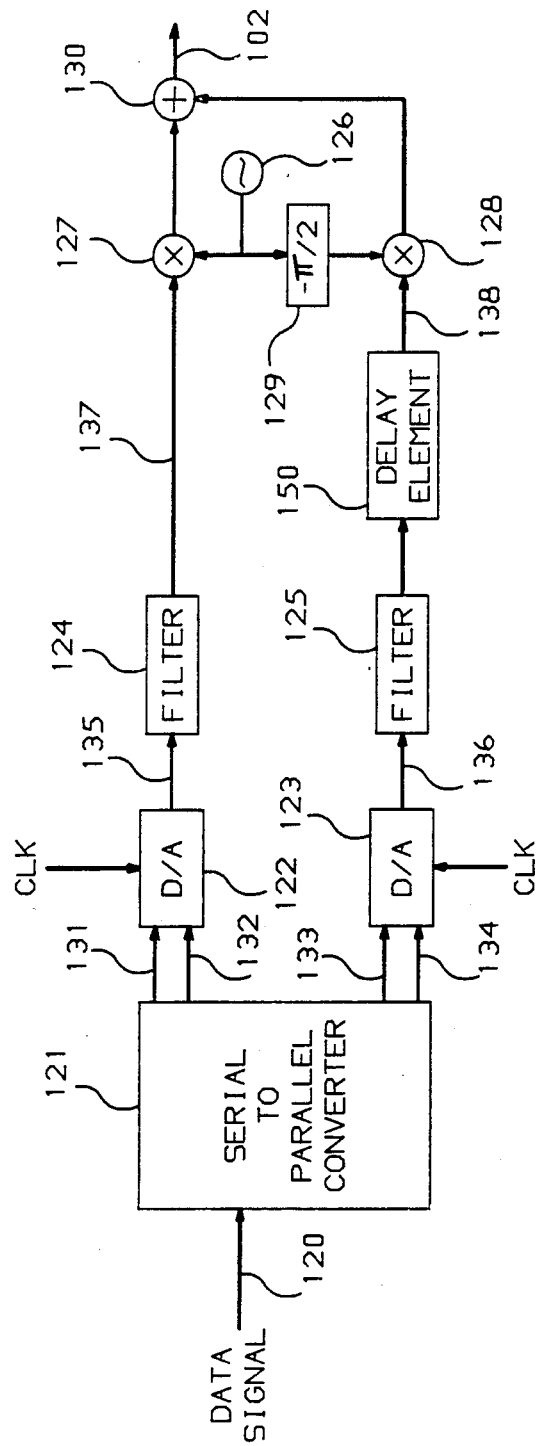
FIG. 1 is a block schematic diagram of the transmitter of an illustrative communications system in accordance with the present invention.

FIG. 1 shows the transmitter of a communications system utilizing QAM modulation and incorporating the present invention. For purposes of illustration, it is assumed that a 16 QAM modulation format is being used so that information is conveyed on each carrier signal at 4 discrete amplitude levels. As shown in FIG. 1, an input bitstream on lead 120 is coupled through serial-to-parallel converter 121 which spreads successive bits onto leads 131 through 134, respectively. Digital-to-analog (D/A) converter 122, clocked by signal CLK, quantizes each of the different bit combinations or digital symbols of the data signal simultaneously appearing on leads 131 and 132 into an associated one of four signal voltages which appears on lead 135. Similarly, D/A converter 123, also clocked by signal CLK, quantizes each of the different combination of bits or digital symbols of the other data signal simultaneously appearing on leads 133 and 134 into an associated one of four signal voltages. Each of these associated signal voltages appears on lead 136. These signal voltages are respectively smoothed by filters 124 and 125, which are typically half-Nyquist filters but could be filters which provide more arbitrary spectral shaping. It should, of course, be understood that while in 16 QAM, 4 signal voltages appear on leads 135 and 136, this number varies with the modulation format and the present invention can be used with any number of signal voltages. Furthermore, while in the disclosed embodiment, the value of each data signal at any time is independent of the other, such independence is not required for the present invention.

Multiplier 127 modulates the amplitude of a carrier signal generated by oscillator 126 with the filtered signal on lead 137. In similar fashion, multiplier 128 modulates the amplitude of a second carrier signal with the data signal on lead 136 after the data signal is smoothed by filter 125, delayed by delay element 150, and coupled to lead 138. Delay element 150 introduces a delay which is a function of an IF frequency chosen at the receiver which, in turn, is related to the baud or symbol rate of the signals appearing on leads 135 and 136. This will be described in detail later. Of course, this differential delay can be introduced into either one of signals supplied to multipliers 127 and 128 and the delay element can be located any place between D/A converter 122 or 123 and one of the multipliers. Or, alternatively, this delay can be provided by delaying the clocking of one of the D/A converters with respect to the other. As will be shown, use of this differential delay simplifies the recovery of the data signals in the receiver.

The second carrier signal supplied to multiplier 128 is produced by shifting the carrier signal generated by oscillator 126 by $-\pi/2$ radians via phase shifter 129. Hence, the pair of carrier signals supplied to multipliers 127 and 128 are in phase quadrature to one another. Summer 130 then adds the products provided by multipliers 127 and 128 and outputs this sum onto lead 102. This IF signal may be directly transmitted to a system receiver or can be frequency translated to some other frequency, typically a higher frequency in the radio band, prior to transmission. For purposes of illustration, it will be assumed that such frequency translation is performed using conventional hardware (not shown). In addition, it will be further assumed that the IF frequency of the carrier signals generated by oscillator 126 is set at a typical value of 70 MHz. However, as will be discussed, further simplification of the receiver hardware necessary to recover the digital data signals can be gained in system applications wherein the transmitted carrier signals can have a frequency equal to an integer multiple of the baud rate. Furthermore, this benefit is maximized when the transmitted carrier frequency is equal to the baud rate.

Figure 2:
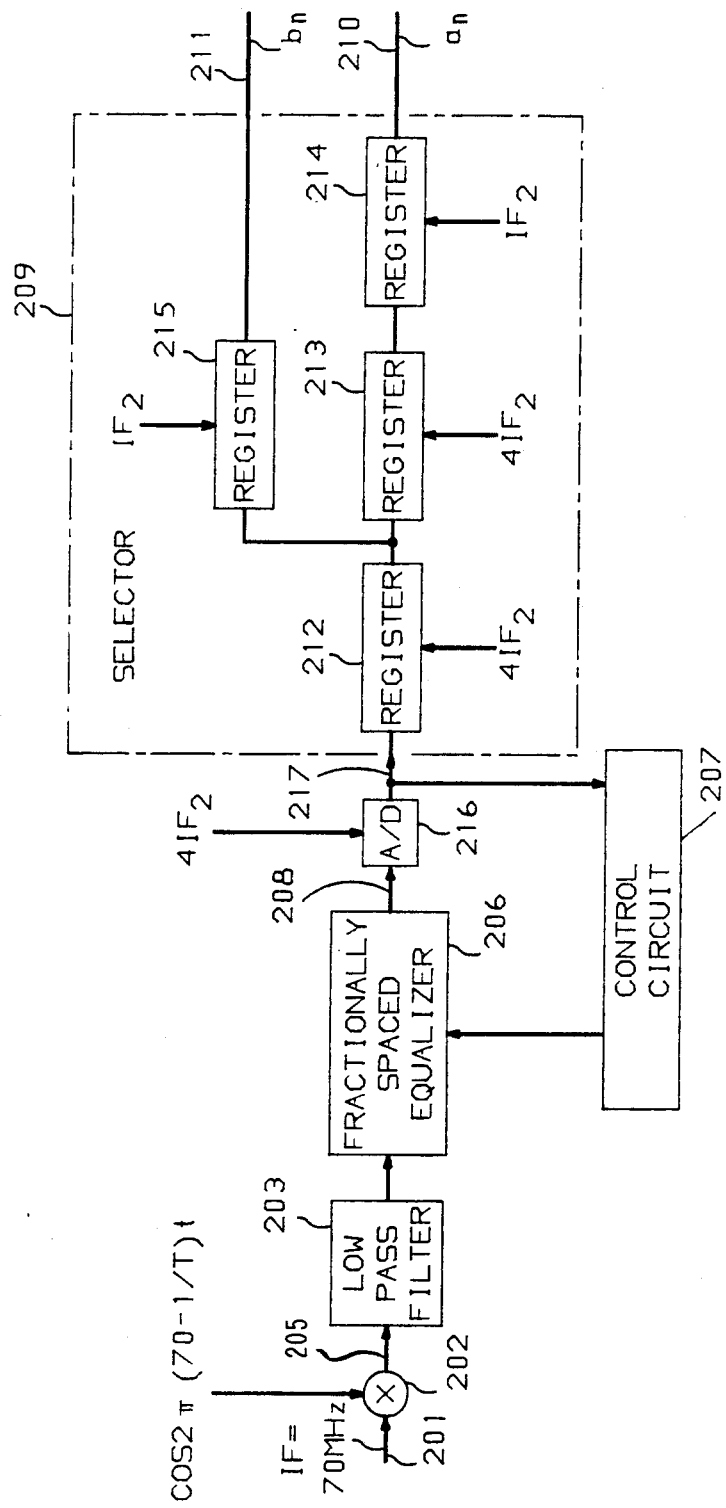
FIG. 2 is a block schematic diagram of the reciver of an illustrative communications system in accordance with the present invention.

Refer now to FIG. 2. After propagating through a dispersive transmission channel, the distorted modulated quadrature-related carrier signals are coupled from the receiving antennas through conventional frequency translation apparatus (both not shown). This frequency translation apparatus in the illustrated embodiment provides a QAM signal on lead 201 whose IF frequency is 70 MHz. Now, pursuant to the present invention, multiplier 202, supplied with an appropriate multiplying signal, frequency translates this 70 MHz IF frequency to provide a QAM signal on lead 205 whose carrier frequency, designated as $IF_2$, is an integer multiple of the baud rate $1/T$ and is preferably equal to the baud rate. For this preferred case, multiplier 202, as illustrated, is supplied with a multiplying signal $\cos 2\pi(70-1/T)t$.

The signal from multiplier 202 is passed through low pass filter 203 to remove the harmonics introduced by frequency translation and is then coupled through equalizer 206. Equalizer 206 is a single fractionally spaced equalizer typically having a tapped delay line and a plurality of tap weights which are regulated by conventional control circuit 207 so that the distortion compensation provided varies with the distortion present in the received QAM signal. Use of the latter eliminates the need to employ ½ Nyquist filters or the like in the receiver. Equalizer 206 can either be at the input to the A/D converter, as shown, or it can be at the output of the A/D converter, depending on whether it is to be implemented in an analog or digital fashion, respectively. At this juncture, it should also be understood that the use of multiplier 202 is not required if the If signal created by summing the outputs of multipliers 127 and 128 in FIG. 1 has a frequency which is an integer multiple of the baud rate and this frequency is transmitted to the receiver. In such a case, the required mathematically described relationship would be $$f_{IF} = m \cdot \frac{1}{T} \text{ Hz} \tag{1}$$

where $f_{IF}$ is the IF frequency in Hz, m is a positive integer, and T is the baud interval in seconds.

Assuming that equalizer 206 is a conventional, adaptive, fractionally spaced equalizer whose coefficients are updated by control circuit 207, it can be shown that the dta signals appearing on leads 135 and 136 of FIG. 1 can be directly recovered by selecting certain ones of the outputs of A/D converter 216 each baud interval so long as A/D converter 216 is clocked at a frequency which avoids aliasing in the spectra of the carrier signals on lead 208. One such clocking frequency is $4IF_2$, i.e., 4 times the center frequency of the signal appearing on lead 205. Let us assume that we would always conveniently choose the clocking frequency of the A/D converter at the receiver to be $4IF_2$. Then the delay of element 150 in FIG. 1 should be governed by:

$$\text{Delay} = T/4m \text{ seconds} \tag{2}$$

where T is again the baud interval and m is the positive integer used in equation (1). Although other delay choices are possible under specific conditions, the relationship expressed by equations (1) and (2) are also appropriate. For purposes of discussion, it will hereinafter be assumed that the QAM signal center frequency transmitted to the receiver $=1/T$, which means a selection of $m=1$ in equations (1) and (2).

To understand how the data signals can be recovered by selection of the certain ones of the outputs of A/D converter 216 each baud interval, consider that an ideal IF QAM signal having a carrier frequency of $1/T$ can be represented as:

$$\cos 2\pi \frac{1}{T} t \sum_{n=-\infty}^{\infty} a_n p(t - nT) + \tag{3}$$

$$\sin 2\pi \frac{1}{T} t \sum_{n=-\infty}^{\infty} b_n p\left(t - nT - \frac{T}{4}\right);$$

where $a_n$ and $b_n$ are the digital symbols embedded in the data signals on lead 135 and 136, respectively, and the subscript n is an integer that denotes their position in time;

p(t) is the impulse response time function; and

T is the symbol period or baud interval.

Figure 3:
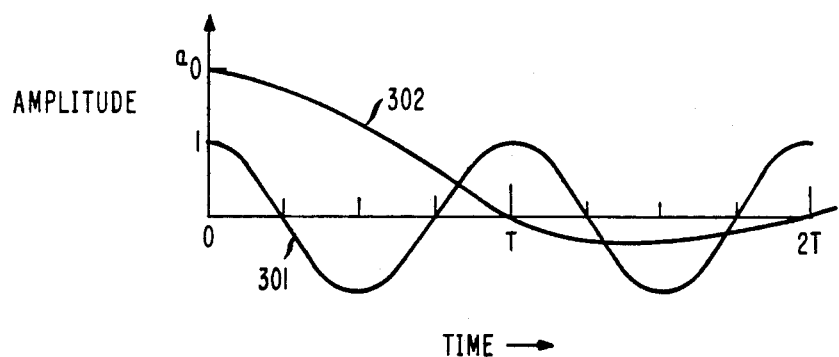
FIGS. 3 and 4 are time waveforms which are helpful in understanding the principles of the present invention.

FIG. 3 shows the waveform $\cos 2\pi 1/Tt$, designated as 301, and a single symbol weighted impulse time function $a_0 p(t)$, designated as 302. If the A/D converter 216 of FIG. 2 outputs signals every T/4 seconds and we assume for the moment that the second term $$\sin 2\pi \frac{1}{T} t \sum_{n=-\infty}^{\infty} b_n p\left(t - nT - \frac{T}{4}\right)$$

is 0, then the output of A/D converter 216, comprised of terms like the product of waveforms 301 and 302, can be tabulated as a function of discrete time samples as shown in Table I.

TABLE I

| Output | Time |
|---|---|
| . | . |
| . | . |
| . | . |
| $a_0$ | 0T |
| 0 | T/4 |
| $a_0'$ | 2T/4 |
| 0 | 3T/4 |
| $a_1$ | T |
| 0 | 1¼T |
| $a_1'$ | 1½T |
| 0 | 1¾T |
| $a_2$ | 2T |
| 0 | 2¼T |
| $a_2'$ | 2½T |
| . | . |
| . | . |

TABLE I-continued

| Output | Time |
|---|---|
| . | . |

In the foregoing tabulation, $a_0, a_1, a_2$ represent successive digital symbols on leads 135 and $a_0', a_1', a_2'$ represent different combinations of the transmitted $a_n$ symbols. Accordingly, $a_0', a_1'$ and $a_2'$ are each symbol sequence dependent and each bears no direct relationship to $a_0, a_1$ and $a_2$, respectively.

Figure 4:
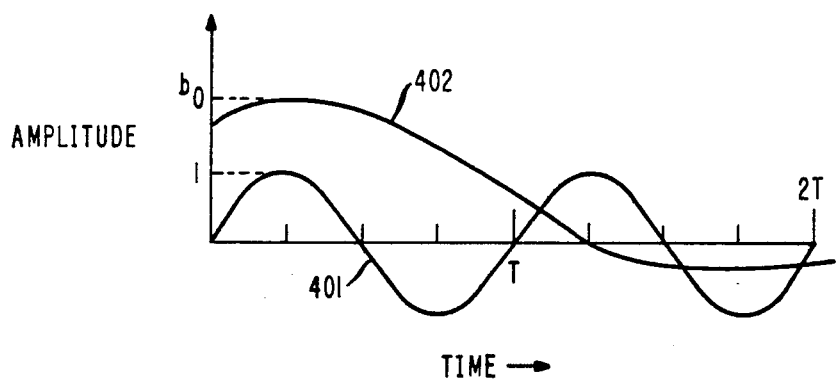

Refer now to FIG. 4 which shows the function $\sin 2\pi t/T$, designated as 401, and a single symbol weighted impulse time function $b_0 p(t-T/4)$ designated as 402, where delay element 150 of FIG. 1 has provided a delay of T/4 seconds. The product of waveforms like 401 and 402, exemplifying part of the sampled output of A/D converter 216, can be tabulated as shown in Table II.

TABLE II

| Output | Time |
|---|---|
| . | . |
| . | . |
| . | . |
| 0 | 0T |
| $b_0$ | T/4 |
| 0 | T/2 |
| $b_0'$ | 3T/4 |
| 0 | T |
| $b_1$ | 1¼T |
| 0 | 1½T |
| $b_1'$ | 1¾T |
| 0 | 2T |
| $b_2$ | 2¼T |
| . | . |
| . | . |
| . | . |

In Table II, symbols $b_0, b_1$, etc., represent successive digital symbols on lead 136 and symbols $b_0', b_1'$, etc., represent different combinations of the transmitted $b_n$ symbols and are, therefore, symbol sequence dependent. Consequently, $b_0'$ and $b_1'$ each have no direct relationship to $b_0$ and $B_1$, respectively.

An examination of Tables I and II reveals that at the output of A/D converter 216, the symbols $a_n$ and $b_n$ each appear explicitly at different times and that the appearance of any $a_n$ symbol in Table I is concurrent with the appearance of a zero sample in Table II. Likewise, the appearance of any $b_n$ symbol in Table II is concurrent with the appearance of a zero sample in Table I. Hence, with a delay of T/4 provided by delay element 150 of FIG. 1, the initial assumption that the term $$\sin 2\pi \frac{t}{T} \sum_{n=-\infty}^{\infty} b_n p\left(t - nT - \frac{T}{4}\right) = 0$$

in forming Table I is not required and the results of Tables I and II can be superimposed in accordance with equation (3) to yield Table III.

TABLE III

| Output of A/D Converter 216 | Time |
|---|---|
| $a_0$ | 0T |
| $b_0$ | T/4 |
| $a_0'$ | T/2 |
| $b_0'$ | 3T/4 |
| $a_1$ | T |
| $b_1$ | 5T/4 |

TABLE III-continued

| Output of A/D Converter 216 | Time |
|---|---|
| $a_1'$ | 6T/4 |
| $b_1'$ | 7T/4 |
| $a_2$ | 2T |
| $b_2$ | 2¼T |

Table III clearly shows that 2 of the 4 outputs provided by A/D converter 216 each symbol period are the digital symbols on leads 135 and 136. Specifically, symbols $a_0, a_1, a_2, \ldots$, which are the signals on lead 135 in FIG. 1, appear at times $t=0T, T, 2T, \ldots$ and symbols $b_0, b_1, b_2, \ldots$, which are the signals on lead 136 in FIG. 1, appear at times $t=T/4, 1\frac{1}{4}T, 2\frac{1}{4}T$, etc. Now, refer back to FIG. 2. The output of equalizer 206 is connected to A/D converter 216 which, clocked at $4IF_2$, quantizes the analog QAM signal into a preselected number of digital signal levels. The number of these digital signal levels is at least equal to those provided by D/A converters 122 and 123 in FIG. 1. These signal levels appear on bus 217 and are supplied to selector 209.

Selector 209 is connected to bus 217 and respectively couples the transmitted digital symbols designated as $a_n$ and $b_n$ to busses 210 and 211. These digital symbols are coupled to baseband receiver circuitry for further signal processing. Control circuit 207 which adjusts the distortion compensation provided by equalizer 206 acts in conventional fashion to the outputs of A/D converter 216 appearing on bus 217.

Selector 209 comprises three serially connected, parallel-in, parallel-out registers 212, 213, 214 and a parallel-in, parallel-out register 215 connected to the output of register 212. To selectively couple only digital symbols $a_n$ and $b_n$ to buses 210 and 211, registers 212 and 213 are clocked at $4IF_2$ and registers 214 and 215 are clocked at $IF_2$. Each register provides a delay equal to one period of its associated clocking signal.

It should, of course, be understood that while the present invention has been disclosed in terms of a specific embodiment, numerous other arrangements may be apparent to those skilled in the art without departing from the spirit and scope of the invention. For example, if equalizer 206 was digitally implemented, then A/D converter 216 would immediately precede it and the outputs of equalizer 206 would be coupled to selector 209 and control circuit 207.

What is claimed is:

1. Transmitter apparatus comprising
means for delaying one signal of a pair of synchronized data signals having a common symbol rate with respect to the other signal, each of said data signals having values which are independent of the other, said delaying means providing a precalculated delay expressible as T/4m, where m is a preselected integer and T is the inverse of said common symbol rate said delaying means allowing recovery of said pair of data signals in a receiver by sampling an equalizer output signal,
means for providing a first carrier signal and a second carrier signal in phase quadrature with the first, and
means for modulating said first carrier signal by said one signal and said second carrier signal by the other signal.

2. Receiver apparatus for recovering data signals having the same symbol rate from distorted quadrature-related carrier signals, said receiver apparatus comprising an equalizer for removing distortion, an analog-to-digital converter serially connected to said equalizer, the serial combination of said equalizer and analog-to-digital converter providing a plurality of distortion-free output signals within a predetermined time interval when supplied with said quadrature-related carrier signals having a center frequency equal to N times said symbol rate, where N is any positive integer, and means responsive to said output signals for selecting a subset thereof within said time interval, said selected outputs being said data signals.

3. The apparatus of claim 2 wherein said receiver includes means for translating said quadrature-related carrier signals from any center frequency to said center frequency.

4. The apparatus of claim 2 wherein said equalizer is a fractionally-spaced equalizer.

5. The apparatus of claim 2 wherein said quadrature-related carrier signals have a frequency spectra and said plurality of output signals is sufficient in number to avoid aliasing in said spectra.

6. The apparatus of claim 2 wherein N is 1.

* * * * *